No. 777,886. PATENTED DEC. 20, 1904.
W. H. ELY.
EYESIGHT TESTING DEVICE.
APPLICATION FILED SEPT. 12, 1904.
NO MODEL.
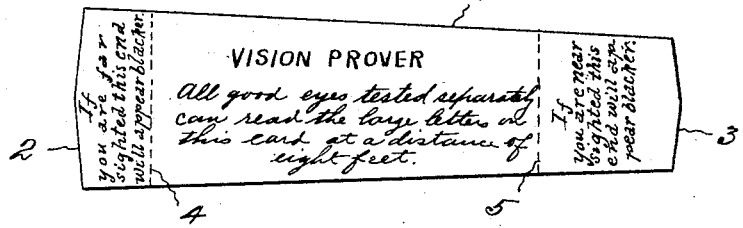
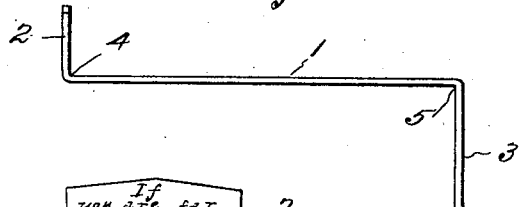
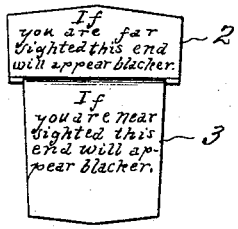
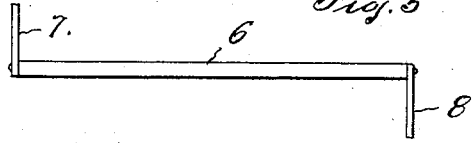
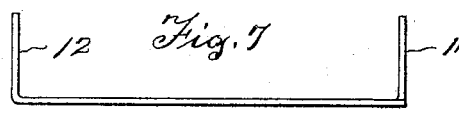
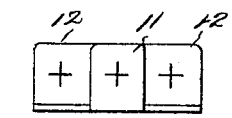

No. 777,886. Patented December 20, 1904.

UNITED STATES PATENT OFFICE.

WILLIAM H. ELY, OF MIDDLETOWN, CONNECTICUT.

EYESIGHT-TESTING DEVICE.

SPECIFICATION forming part of Letters Patent No. 777,886, dated December 20, 1904.

Application filed September 12, 1904. Serial No. 224,115.

*To all whom it may concern:*

Be it known that I, WILLIAM H. ELY, a citizen of the United States, residing at Middletown, in the county of Middlesex and State of Connecticut, have invented a new and useful Eyesight-Testing Device, of which the following is a specification.

This invention relates to a device which can be used by any one for detecting presbyopia and myopia.

The object of the invention is to provide a very simple testing device having two targets which can be instantly compared for the purpose of detecting whether the sight of an eye is far or near.

This invention resides in a device having two targets provided with words, letters, lines, or characters arranged nearly in line with each other at a predetermined distance apart, whereby a comparison can instantly be made between the appearance of the words, letters, lines, or characters on the two targets.

Figure 1 of the accompanying drawings shows an edge view of a blank from which one of these testing devices may be made. Fig. 2 shows a plan of this blank. Fig. 3 shows an edge view of a testing device made from this blank. Fig. 4 shows an end view of the testing device made from this blank. Fig. 5 shows an edge view of a modified form of the testing device. Fig. 6 shows an edge view of another form of the testing device. Fig. 7 shows an edge view of still another form, and Fig. 8 shows an end view of this last form.

The form of this testing device (shown in Figs. 1 to 4) may be made from a sheet of paper, cardboard, celluloid, or the like composition, or wood, tin, brass, aluminium, or other thin metal. It is preferred to cut the blank 1 from thin material and to stamp, print, or otherwise apply to the ends 2 and 3 substantially the same words, letters, lines, or characters. The device between the ends may be shaped as taste may dictate and may be ornamented, stamped, or printed with any suitable pattern for the purpose of making the device attractive or with lettering for the purpose of imparting information and directions or advertising matter. Before using this device the end 2 is turned upwardly on the line 4, which is preferably a scoring in the material, so that the end will turn up easily, and the end 3 is turned downwardly on the line 5. The upturned and downturned ends form targets with the suitable test words, letters, lines, or characters a few inches apart and get in line with each other, so that the eyesight can be instantly changed from one to the other and the impression of the relative sizes and distinctness of the words, letters, lines, or characters be retained. When this device is held in the hand or placed on any other support with the downturned end eight or ten inches from the chin, if the focus of the eye is normal the words, letters, lines, or characters on each end will appear equally black and distinct. If the focus of the eye being tested is too far, the words, letters, lines, or characters on the upturned target will appear more distinct and blacker. If the focus of the eye is too near, the words, lines, or characters on the downturned target will appear more distinct and blacker than those at the other end. With these two targets held at a fixed distance apart and nearly in line with each other the eye can be turned from one to the other when a test is being made, so that a comparison may be made between the distinctness or blackness of the words, letters, lines, or characters before the impression as to the distinctness or blackness becomes effaced or confused. The body of this device may have letters or characters which may be used for testing the range of the vision and, although made of thin material, as one end is turned one way and the other end turned the other way the device will readily stand on a support in order that it may be viewed from a distance—as, for instance, eight feet away.

If desired, instead of making the device from thin sheet material and turning up the ends it may be formed as shown in Fig. 5, in which the body 6 may be a bar of wood or other material, and the upturned target 7 and the downturned target 8 may be formed of any suitable material fastened to the ends of the bar.

The device could be formed, as shown in Fig. 6, of sheet material, with the end 9 rolled upwardly and the end 10 rolled downwardly and the targets placed on these ends, or it could be formed of a wire bent as shown in Fig. 6, with the targets attached to the ends.

If desired, both targets could be arranged to stand upright. In this form of the device the target 11, at one end, could be narrow, while the target 12, at the other end, could be wide, so that the vision would take in both targets at the same time in order to compare the relative appearance of the characters on the two targets.

The shape of the device or the material from which it is made is not essential to the invention, nor are the words, letters, lines, or characters which are placed on the targets, for these may be greatly varied without departing from the invention.

The invention claimed is—

1. A device for testing for presbyopia and myopia having a body with two targets at a fixed distance from each other, the said targets being provided with similar words, letters or characters arranged so that when the device is in use they will be close to the focal axis of the eye being tested, substantially as specified.

2. A device for testing for presbyopia and myopia having a body with two targets, one extending in one direction from an end of the body and the other extending in the opposite direction from the other end of the body, the said targets being provided with similar words, letters, lines or characters, substantially as specified.

3. A device for testing for presbyopia and myopia formed of a single piece of material and having its ends provided with similar words, letters, lines or characters and adapted to be turned in opposite directions, substantially as specified.

4. A device for testing for presbyopia and myopia formed of a single piece of thin material and having its ends bent in opposite directions, substantially as specified.

5. A device for testing for presbyopia and myopia formed of a single piece of thin material and having its ends bent so that when the device is in use they will both be close to the focal axis of the eye being tested, substantially as specified.

6. A device for testing for presbyopia and myopia having a body with two targets, one extending in one direction from an end of the body and the other extending in the opposite direction from the other end of the body, the said targets being provided with words, letters or characters for testing the eye, substantially as specified.

WILLIAM H. ELY.

Witnesses:
R. C. MARKHAM,
E. A. O'KEEFE.